(12) United States Patent
Rosikiewicz et al.

(10) Patent No.: US 8,135,748 B2
(45) Date of Patent: Mar. 13, 2012

(54) VIRTUAL MACHINE DATA REPLICATION

(75) Inventors: James Rosikiewicz, Stockton, NJ (US); Ronald T. McKelvey, Morris Plains, NJ (US); Alexander D. Mittell, Cedar Knolls, NJ (US)

(73) Assignee: PHD Virtual Technologies, Philadelphia, PA (US)

( * ) Notice: Subject to any disclaimer, the term of this patent is extended or adjusted under 35 U.S.C. 154(b) by 157 days.

(21) Appl. No.: 12/758,371

(22) Filed: Apr. 12, 2010

(65) Prior Publication Data

US 2010/0262586 A1   Oct. 14, 2010

Related U.S. Application Data

(60) Provisional application No. 61/168,315, filed on Apr. 10, 2009, provisional application No. 61/168,318, filed on Apr. 10, 2009, provisional application No. 61/172,435, filed on Apr. 24, 2009.

(51) Int. Cl.
*G06F 17/30* (2006.01)

(52) U.S. Cl. ......... 707/791; 707/802; 707/822; 707/808

(58) Field of Classification Search ........... 707/600–831
See application file for complete search history.

(56) References Cited

U.S. PATENT DOCUMENTS

| | | | |
|---|---|---|---|
| 6,629,110 B2 | 9/2003 | Cane et al. | |
| 6,865,655 B1 | 3/2005 | Andersen | |
| 6,871,271 B2 | 3/2005 | Ohran et al. | |
| 6,912,645 B2 | 6/2005 | Dorward et al. | |
| 6,948,039 B2 | 9/2005 | Biessener et al. | |
| 7,093,086 B1 | 8/2006 | Van Rietschote | |
| 7,107,486 B2 | 9/2006 | Okada et al. | |
| 7,134,041 B2 | 11/2006 | Murray et al. | |
| 7,152,078 B2 | 12/2006 | Yamagami | |
| 2005/0060609 A1 | 3/2005 | El-Batal et al. | |
| 2006/0064444 A1 | 3/2006 | van Ingen et al. | |
| 2006/0075294 A1 | 4/2006 | Ma et al. | |
| 2007/0083722 A1 | 4/2007 | Per et al. | |
| 2007/0208918 A1* | 9/2007 | Harbin et al. | 711/162 |
| 2010/0049930 A1 | 2/2010 | Pershin et al. | |

* cited by examiner

*Primary Examiner* — Isaac M Woo
(74) *Attorney, Agent, or Firm* — Carter, DeLuca, Farrell & Schmidt, LLP; Russell S. Salerno

(57) ABSTRACT

Disclosed is a method and system for selectively restoring file-level data from a disk image backup. In embodiments, a virtual machine backup may be performed by dividing a virtual machine virtual disk file into a plurality of discrete fixed-sized data blocks sharing a common index file that is stored on a backup medium, such as a hard drive, to form a backup set. Upon restoration of data from the backup set, individual blocks of the data set are compared to corresponding blocks of the target virtual machine file. Redundant data and unchanged blocks are skipped, and only those block which have changed are restored to the target file. In this manner network bandwidth and processor resources are conserved, and replication times decreased.

15 Claims, 6 Drawing Sheets

VIRTUAL MACHINE DATA REPLICATION

CROSS REFERENCE TO RELATED APPLICATIONS

The present application claims the benefit of and priority to U.S. Provisional Application Ser. No. 61/168,315, filed on Apr. 10, 2009, entitled "VIRTUAL MACHINE DATA BACKUP"; U.S. Provisional Application Ser. No. 61/168,318, filed on Apr. 10, 2009, entitled "VIRTUAL MACHINE FILE-LEVEL RESTORATION"; and U.S. Provisional Application Ser. No. 61/172,435, filed on Apr. 24, 2009, entitled "VIRTUAL MACHINE DATA REPLICATION"; the entirety of each are hereby incorporated by reference herein for all purposes.

BACKGROUND

1. Technical Field

The present disclosure relates to computer data backup, and in particular, to a system and method for performing block-level backups of virtual machine, wherein backed up data is stored in de-duplicated form in a hierarchical directory structure.

2. Background of Related Art

Continuing advances in storage technology allow vast amounts of digital data to be stored cheaply and efficiently. However, in the event of a failure or catastrophe, equally vast amounts of data can be lost. Therefore, data backup is a critical component of computer-based systems. As used herein, the term "backup" may refer to the act of creating copies of data, and may refer to the actual backed-up copy of the original data. The original data typically resides on a hard drive, or on an array of hard drives, but may also reside on other forms of storage media, such as solid state memory. Data backups are necessary for several reasons, including disaster recovery, restoring data lost due to storage media failure, recovering accidentally deleted data, and repairing corrupted data resulting from malfunctioning or malicious software.

A virtual machine (VM) is a software abstraction of an underlying physical (i.e., hardware) machine which enables one or more instances of an operating system, or even one or more operating systems, to run concurrently on a physical host machine. Virtual machines have become popular with administrators of data centers, which can contain dozens, hundreds, or even thousands of physical machines. The use of virtual servers greatly simplifies the task of configuring and administering servers in a large scale environment, because a virtual machine may be quickly placed into service without incurring the expense of provisioning a hardware machine at a data center. Virtualization is highly scalable, enabling servers to be allocated or deallocated in response to changes in demand. Support and administration requirements may be reduced because virtual servers are readily monitored and accessed using remote administration tools and diagnostic software.

In one aspect, a virtual server consists of three components. The first component is virtualization software configured to run on the host machine which performs the hardware abstraction, often referred to as a hypervisor. The second component is a data file which represents the filesystem of the virtual machine, which typically contains the virtual machine's operating system, applications, data files, etc. A virtual machine data file may be a hard disk image file, such as, without limitation, a Virtual Machine Disk Format (VMDK) format file. Thus, for each virtual machine, a separate virtual machine file is required. The third component is the physical machine on which the virtualization software executes. A physical machine may include a processor, random-access memory, internal or external disk storage, and input/output interfaces, such as network, storage, and desktop interfaces (e.g., keyboard, pointing device, and graphic display interfaces.)

Virtual machine files may be backed up as images, or replications of the complete virtual machine file. Such backup schemes may logically divide and store the virtual machine file into a number of smaller logical blocks which taken together constitute a "snapshot" of an entire filesystem as it existed at the time the backup was performed. While such systems are well-suited for restoring an entire filesystem, such systems may have drawbacks. For example, during a restoration procedure an entire filesystem may need to be transferred from a backup device to a destination device, even though only a subset of the destination blocks may have changed since the last backup was performed. In another example, it may be desirable to restore a virtual machine back to a state which existed at a particular point in time. A backup system which performs virtual server backups with increased efficiency and effectiveness while permitting the restoration of only that data which was modified since the last backup, and/or the last restoration, would be a welcome advance.

SUMMARY

The present disclosure is directed to a method of performing selective restoration of a volume level backup set, or archive. The volume level backup set, or archive, may include a virtual machine file, e.g., a VMDK file. In one embodiment, the backup set includes a plurality of fixed-sized blocks representative of a virtual machine file (e.g., a virtual disk file and/or a VMDK file) and an index file indicative, at least in part, of the positions of the individual fixed-size blocks within the archive. Such a backup is described in the commonly-owned, concurrently-filed U.S. patent application Ser. No. 12/758,345 entitled "VIRTUAL MACHINE DATA BACKUP", the entirety of which is hereby incorporated by reference herein for all purposes.

The disclosed method processes 1 MB fixed-length blocks of data of a virtual machine file. A unique identifier, such as without limitation, an MD5 hash, is created for this block data. The 1 MB of data can be compressed, or left uncompressed. The 1 MB of data is stored as a single file. The file name is based at least in part on the hash value of the 1 MB data block. The hash of this file is saved in a separate index file for later use to retrieve, validate, and rebuild the backup data. The data blocks, whether in compressed or uncompressed form, are stored at a storage destination, in a unique directory structure consisting of 256 first level directories designated as 00-FF, each having 256 second level directories designated as 00-FF within, comprising 65,536 directories in total. The 1 MB compressed (or uncompressed) data files are stored in the directory structure based on the first four bytes of the hash, e.g., "./00/22/T.002249a8a218ef8a4da87550f388942d.gz".

The first four bytes of data for the file name are "0022". The file is stored in directory "./00/22/". The .gz extension indicates the file is compressed.

Subsequent backups are performed having as a destination the same storage location. Data blocks are generated using the above unique hash. A file query is made to the storage location to see if there is already a file existing with the same hash. If the file does not exist, the source data is written into the directory hierarchy with the hash as the file name and an index file is updated. If the file exists, then only the index file is updated for the current backup being run.

Over time the directory structure will accumulate data blocks from all backups sent thereto. A separate index file is created for each backup, and is used to keep track of the blocks of data for, e.g., re-assembling data block of the original source during restoration.

The use of a hash also provides a self-checking mechanism which enables self-validation of the data within the stored file. A routine may be scheduled to run on an ad-hoc or periodic basis that reads the data within a stored file, and validates the data in the file to verify a match to the hash file name. If the data does not match, the block is considered suspect, and is slated to be deleted. All associated backups that include this data block are flagged as "bad". The index file corresponding to backups so flagged may additionally or alternatively include a "bad" flag.

In an embodiment, the data blocks (e.g., the 1 MB data blocks) may be evaluated to determine whether the data contained therein exhibits a predefined ("special") data pattern. For example with limitation, a special data pattern may include a particular or repeating pattern, e.g., a data block consisting entirely of zero (00H) bytes. In this instance, a special hash is generated that represents the special data block containing the particular data pattern. The special hash may be hard-coded, defined in a database, and/or defined in a configuration file. Since the contents of a special data block is predefined, it is only necessary to record the fact that the data block is special. It is unnecessary to store the actual contents of a special block. Thus, for each data block identified as special, the index file is updated accordingly and the backup proceeds. In this manner, resources are conserved since special blocks, e.g., null blocks, do not consume space on the storage device, do not use communication bandwidth during backup and restoration procedures, do not require as much computational resources, and so forth. This provides an efficient way to skip special (e.g., null) data in a given backup set.

In one embodiment, a software service is configured to execute on a virtual machine host server. The host server is programmed to look for new backups of a virtual machine, which may be performed on a scheduled basis. A first restoration writes every data block comprising the backup set onto the virtual disk. If a subsequent backup is performed or identified, the disclosed method then determines which, if any, new unique data blocks that have been backed up. The later (more recent) backed up data blocks are then overlaid over the original previously restored virtual machine image. In this manner, a remote backup set is kept up-to-date and ready to be activated with minimal compressed or uncompressed data being transferred over the network (e.g., LAN/WAN). Only those datablocks which changed since the most recent full restoration will be restored during subsequent restorations, thereby efficiently restoring backup sets, reducing restoration times, and reducing computing resource usage. The disclosed method may exhibit reduced network utilization, fewer disk I/O operations, and reduced execution times than prior art restoration and replication methods.

During an initial restoration of a virtual machine file, an index file may be consulted (e.g., data read therefrom) to determine which data blocks comprise the specified backup set. The target virtual machine file is reconstructed from the component data blocks thereof at the source machine. Each data block is written to the target virtual machine file such that the original virtual machine file is recreated as it existed when the backup set was initially created. Additionally or alternatively, a virtual machine file or a data block thereof may be flagged as having been restored from a previous backup. Such as flag may be referred to as a "previous restore" flag. During a subsequent restoration of a virtual machine file, a previous restore flag may be read to determine whether a subject virtual machine file and/or data block thereof was previously restored from a backup set. If so, restoration of the subject virtual machine file and/or data block is skipped, thereby eliminating the processing and transfer of redundant and/or duplicative data blocks.

A method in accordance with the present disclosure may permit multi-user access to read data from compressed and/or de-duplicated backup data files and allow for single file or directory restore. In addition an entire virtual disk backup can be read for restoration, replication, or archived to offline storage such as optical media or magnetic tape.

In an embodiment, a method in accordance with the present disclosure for restoring to a first storage device a virtual machine file data from a second storage device containing a backup set of the virtual machine data file, wherein the backup set includes at least one backup datablock and an index file, includes the steps of identifying a backup data block of the backup set corresponding to a target data block of the virtual machine file. A corresponding target data block is evaluated to determine whether it has changed since a previous restoration. The backup data block is written to the target data block in response to an evaluation that the corresponding target data block has changed since a previous restoration.

In another embodiment, a method in accordance with the present disclosure for restoring to a first storage device a virtual machine file data from a second storage device containing a backup set of the virtual machine data file, wherein the backup set includes at least one backup datablock and an index file, includes the steps of identifying a backup data block of the backup set corresponding to a target data block of the virtual machine file. A corresponding target data block is evaluated to determine whether it has changed since a previous backup. The backup data block is written to the target data block in response to an evaluation that the corresponding target data block has changed since a previous backup

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION

Figure 1:
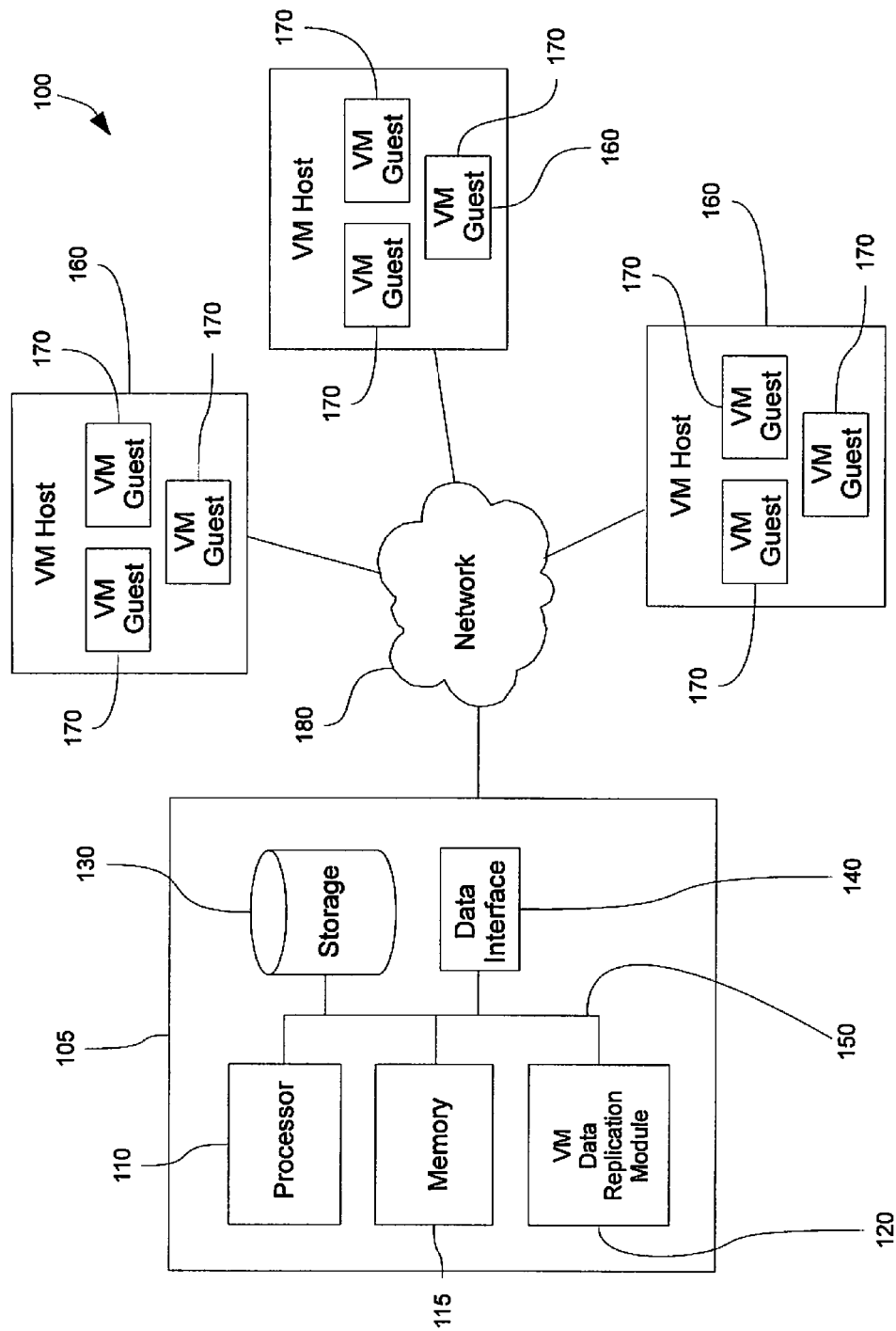
FIG. 1 shows a block diagram of an embodiment of a virtual machine backup system in accordance with the present disclosure.

Particular embodiments of the present disclosure are described hereinbelow with reference to the accompanying drawings; however, it is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure. In the discussion contained herein, the terms user interface element and/or button are understood to be non-limiting, and include other user interface elements such as, without limitation, a hyperlink, clickable image, and the like.

Additionally, the present invention may be described herein in terms of functional block components, code listings, optional selections, page displays, and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices.

Similarly, the software elements of the present invention may be implemented with any programming or scripting language such as C, C++, C#, Java, COBOL, assembler, PERL, Python, PHP, or the like, with the various algorithms being implemented with any combination of data structures, objects, processes, routines or other programming elements. The object code created may be executed by any computer having an Internet Web Browser, on a variety of operating systems including Windows, Macintosh, and/or Linux.

Further, it should be noted that the present invention may employ any number of conventional techniques for data transmission, signaling, data processing, network control, and the like.

It should be appreciated that the particular implementations shown and described herein are illustrative of the invention and its best mode and are not intended to otherwise limit the scope of the present invention in any way. Examples are presented herein which may include sample data items (e.g., names, dates, etc.) which are intended as examples and are not to be construed as limiting. Indeed, for the sake of brevity, conventional data networking, application development and other functional aspects of the systems (and components of the individual operating components of the systems) may not be described in detail herein. Furthermore, the connecting lines shown in the various figures contained herein are intended to represent example functional relationships and/or physical or virtual couplings between the various elements. It should be noted that many alternative or additional functional relationships or physical or virtual connections may be present in a practical electronic data communications system.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, DVD-ROM, optical storage devices, magnetic storage devices, semiconductor storage devices (e.g., USB thumb drives) and/or the like.

The present invention is described below with reference to block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems that perform the specified functions or steps, or suitable combinations of special purpose hardware and computer instructions.

One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

The scope of the invention should be determined by the appended claims and their legal equivalents, rather than by the examples given herein. For example, the steps recited in any method claims may be executed in any order and are not limited to the order presented in the claims. Moreover, no element is essential to the practice of the invention unless specifically described herein as "critical" or "essential."

FIG. 1 illustrates a representative operating environment 100 for an example embodiment of a virtual machine backup system 105 having the capability to perform a file-level restoration in accordance with the present disclosure. Representative operating environment 100 includes virtual machine backup system 105 which can be a personal computer (PC) or a server, which further includes at least one system bus 150 which couples system components, including at least one processor 110; a system memory 115 which may include random-access memory (RAM); at least one storage device 130, such as without limitation one or more hard disks, CD-ROMs or DVD-ROMs, or other non-volatile storage devices, such as without limitation flash memory devices; and a data network interface 140. Virtual machine backup system 105 includes the capability of performing a method of virtual machine backup and/or restoration as disclosed herein. System bus 150 may include any type of data communication structure, including without limitation a memory bus or memory controller, a peripheral bus, a virtual bus, a software bus, and/or a local bus using any bus architecture such as without limitation PCI, USB or IEEE 1394 (Firewire). Data network interface 140 may be a wired network interface such as a 100Base-T Fast Ethernet interface, or a wireless network interface such as without limitation a wireless network interface compliant with the IEEE 802.11 (i.e., WiFi), GSM, or CDMA standard.

Virtual machine backup system 105 may be operated in a networked environment via data network interface 140, wherein system 105 is connected to one or more virtual machine hosts 160 by a data network 180, such as a local area network or the Internet, for the transmission and reception of data, such as without limitation backing up and restoring virtual machine data files as will be further described herein. Each of the one or more virtual machine hosts 160 may include one or more virtual machines 170 operating therein, as will be appreciated by the skilled artisan.

Virtual machine backup system 105 includes a virtual machine data replication module 120 that is configured to perform a method of file restoration as described herein. In an embodiment, virtual machine data replication module 120 includes a set of programmable instructions adapted to execute on processor 100 for performing the disclosed method of virtual machine data replication. In particular, a method for restoring a virtual disk file or virtual machine file, e.g., a VMDK file, from a plurality of datablocks stored within a directory hierarchy is presented herein. The plurality of datablocks may be of equal size, e.g., about 1 MB in size, or may be of varying size.

The present disclosure provides a method for restoring files from a virtual machine image backup. The virtual machine image backup may include a plurality of fixed-size data blocks representative of corresponding blocks of the source virtual machine file, and an index file that may include, without limitation, a list of data blocks, a unique identifier (e.g., a hash value) that uniquely identify a data block, date and time of backup, and source and destination locations.

Figure 2:
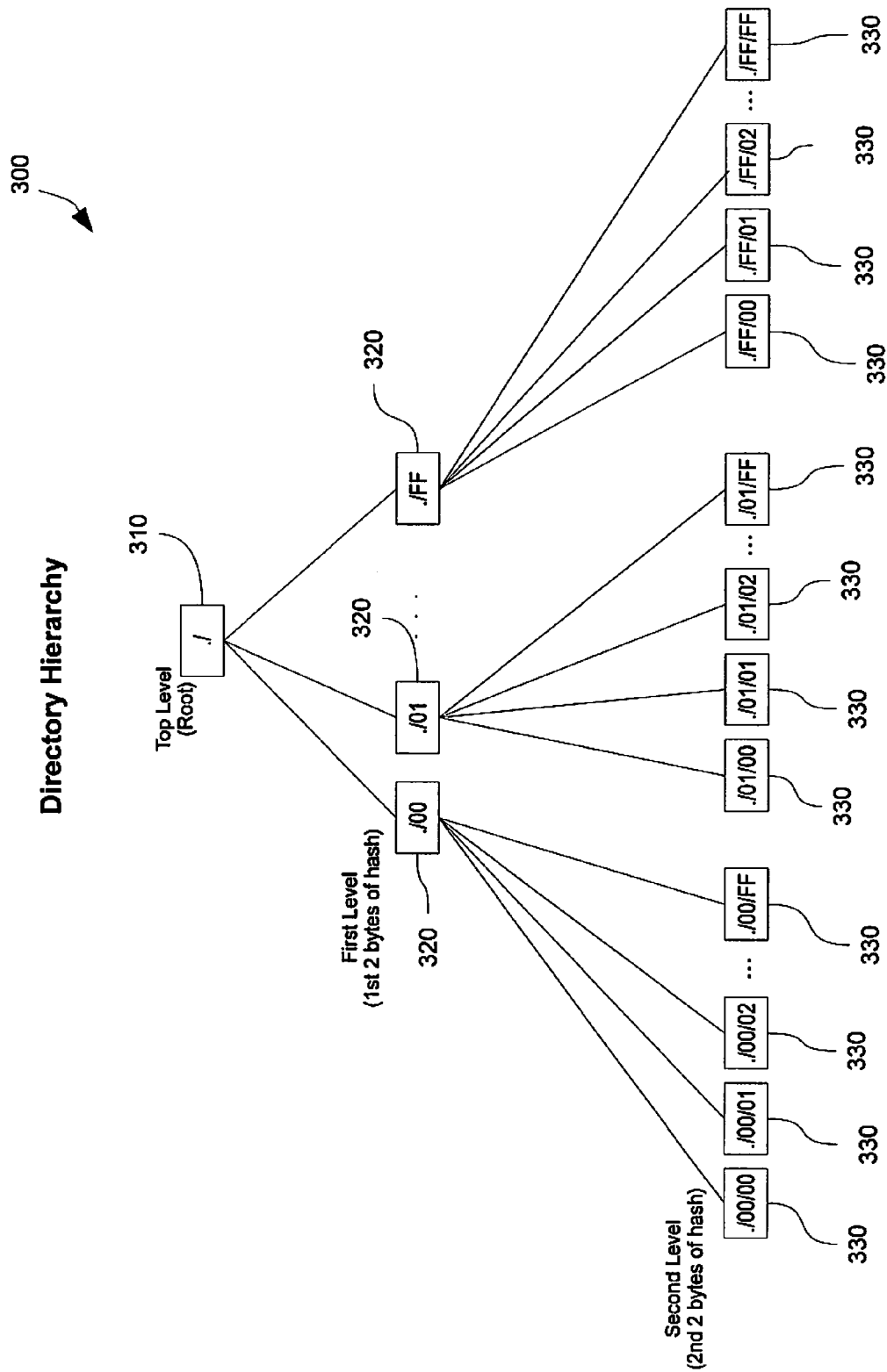
FIG. 2 is a block diagram illustrating a directory hierarchy of an embodiment of a virtual machine backup in accordance with the present disclosure.
Figure 3:
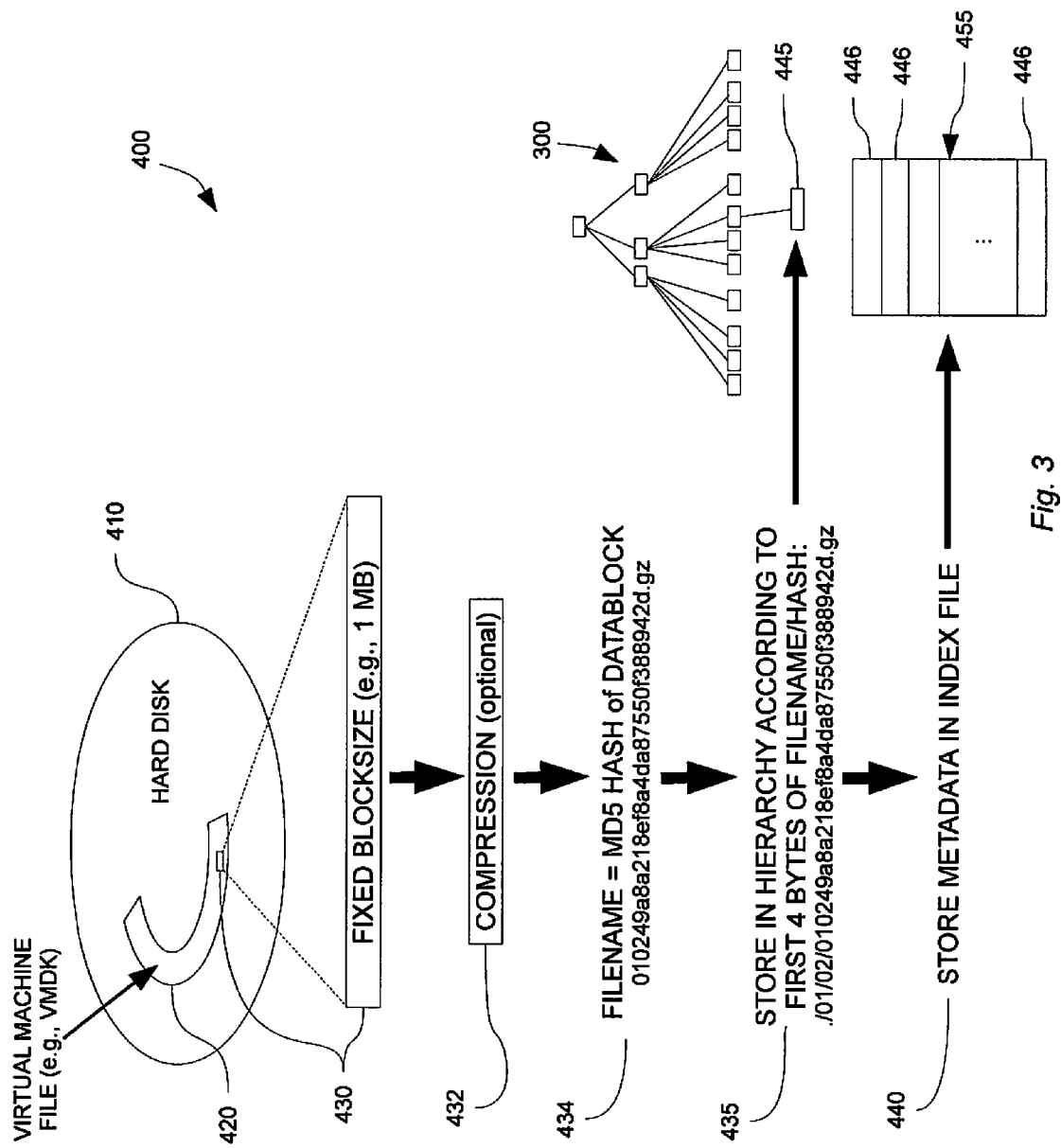
FIG. 3 is a block diagram of an embodiment of a virtual machine backup method in accordance with the present disclosure.

Referring to FIGS. 2 and 3, a virtual machine file 420 slated for backup may be stored on a storage device, such as without limitation, hard disk 410. While it is contemplated that hard disk 410 may be included within a virtual machine host, is it to be understood that a virtual machine file 420 may be stored on a hard disk array, such as a storage-area network (SAN), a redundant array of independent disks (RAID), network-attached storage (NAS) and/or on any storage medium now or in the future known.

The virtual machine file 420 is logically divided into a number of fixed-length blocks 430 of like size. In one embodiment, a blocksize of 1 MB is used, however, it is to be understood that a blocksize of less than 1 MB, or greater than 1 MB, may be used within the scope of the disclosed method. In one aspect, the blocksize is determined at least in part by a correlation between performance and blocksize. Other parameters affecting blocksize may include, without limitation, a data bus speed, a data bus width, a virtual machine file size, a processor speed, a storage device bandwidth, and a network throughput. If the size of a virtual machine does not precisely equal a multiple of a chosen fixed blocksize, the remainder may be padded with e.g., zeros, nulls, or any other fill pattern, to achieve a set of equal-sized blocks.

An individual backup data file 445 is created from each fixed-length block 430 of the virtual machine file 420. In an embodiment, individual backup data file 445 may be given a temporary filename, and/or stored in a temporary location, e.g., /var/tmp/block000001.dat. A hash is generated according to the contents of each individual backup data file. In an embodiment, a 4,096 bit MD5 hash is used to create the hash value from the contents thereof. The resultant hash value is stored in an index file corresponding to the current backup session which store for later use during, e.g., data restoration. The index file may include, without limitation, a list of data blocks comprising the backup set, hash values corresponding thereto, a date and time of backup, a source location, and a destination location. A collection of hash values representative of a backup of virtual machine file, and data associated therewith, may be stored in an index file 455. Such a collection, together with the individual backup data files comprising the backed-up virtual machine file 420 is known as a "backup set."

Additionally or alternatively, the data block 430 may be compressed during a compression step 432 using any suitable manner of data compression, including without limitation, LZW, zip, gzip, rar, and/or bzip. Preferably, lossless data compression is used however in certain embodiments lossy data compression may advantageously be used.

The hash value may be regarded as a unique block identifier, or a unique identifier of a backup data file 455. A nontemporary ("archival") filename of the backup data file may be generated, at least in part, from the hash value, as illustrated in step 434. For example, the filename of a backup data file 455 may be created by appending a hexadecimal representation of the hash value to a file prefix and/or to an appropriate file extension. Each backup data file 455 comprising the virtual machine file therefore has a unique filename based upon the hash value.

A hierarchical directory structure 300 is provided on a backup storage device, e.g., storage device 130, for storing the backup data files. The disclosed structure has at a first level thereof a plurality of directories 320 et seq. (e.g., folders). Each first level directory contains therein a plurality of second level directories 330. In an embodiment, the hierarchy includes 256 first level directories, wherein each first level directory includes 256 second level directories, for a total number of 65,536 directories. The first level and second level directories may be named in accordance with a sixteen bit hexadecimal value, e.g., 00-FF. Thus, for example, a plurality of first level directories may be named in accordance with the series ./00, ./01, ./02 . . . ./FF while a second level of directories may be named ./00/01, ./00/02/ . . . ./00/FF. Other directory mapping schemes are envisioned within the scope of the present disclosure, such as without limitation, a directory hierarchy having fewer than two levels, a directory hierarchy having greater than two levels, a directory hierarchy having a directory naming convention that includes fewer than a sixteen bit hexadecimal value, a directory hierarchy having a directory naming convention that includes greater than a sixteen bit hexadecimal value, and/or a directory hierarchy having a directory naming convention that includes an alternative naming encoding, such as octal, ASCII85, and the like.

An initial backup may be performed wherein all blocks comprising a source (e.g., original) virtual machine file on a source device are stored on a backup device as a backup set.

Each data block may be stored as a file. A source device may be a hard disk drive, however, other source devices, such as without limitation, solid state memory, are contemplated within the scope of the present disclosure. A backup device may be a hard disk drive, tape drive, solid state drive, or any other suitable data storage device. A corresponding index file is created substantially concurrently with storing the source data on the backup device. Additionally or alternatively, each data block may be tagged with a timestamp, e.g., date and time, which may be stored within metadata of a file containing the data block.

Figure 4A:
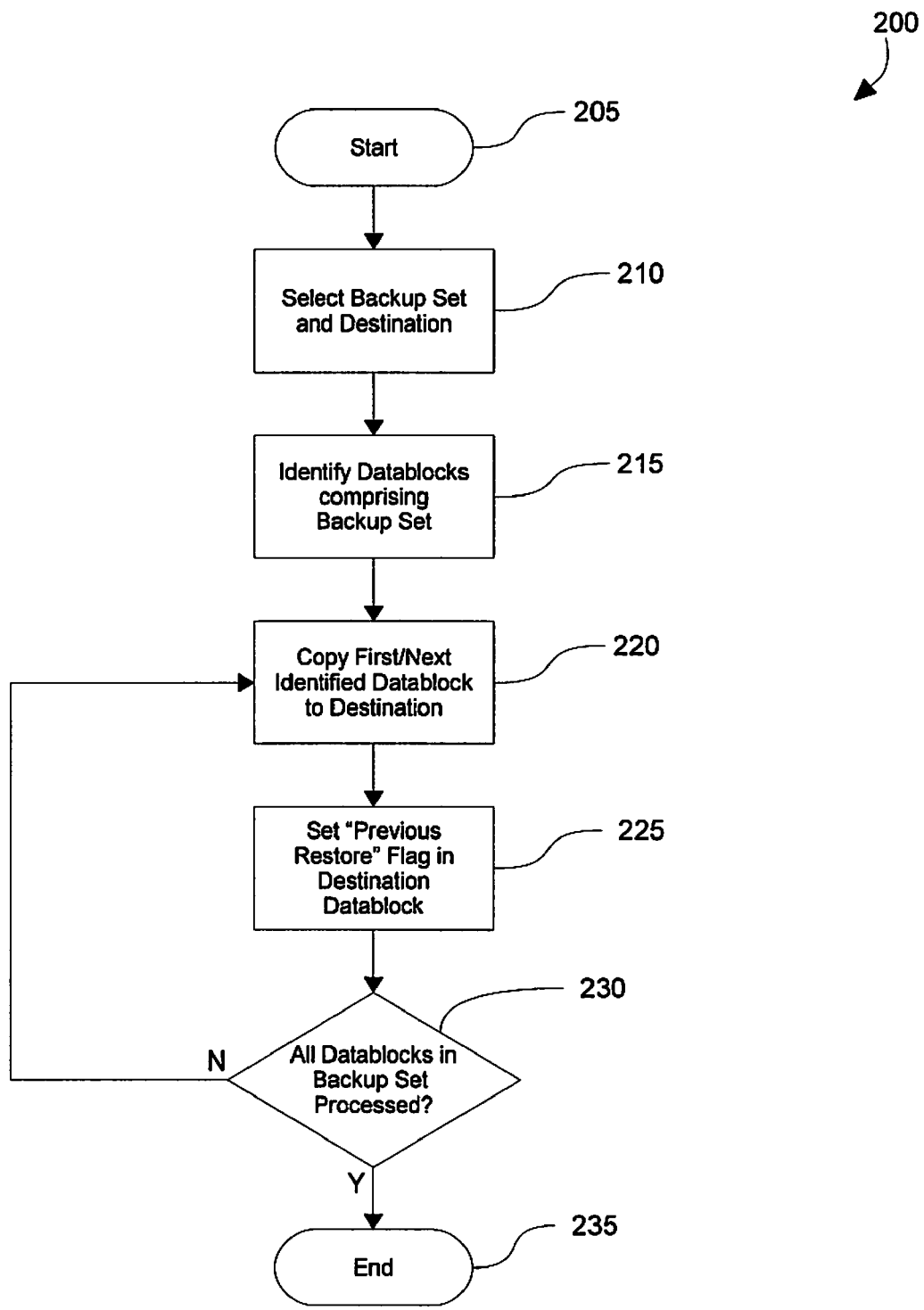
FIG. 4A is a flowchart of an embodiment of an aspect of a virtual machine data replication method in accordance with the present disclosure.
Figure 4B:
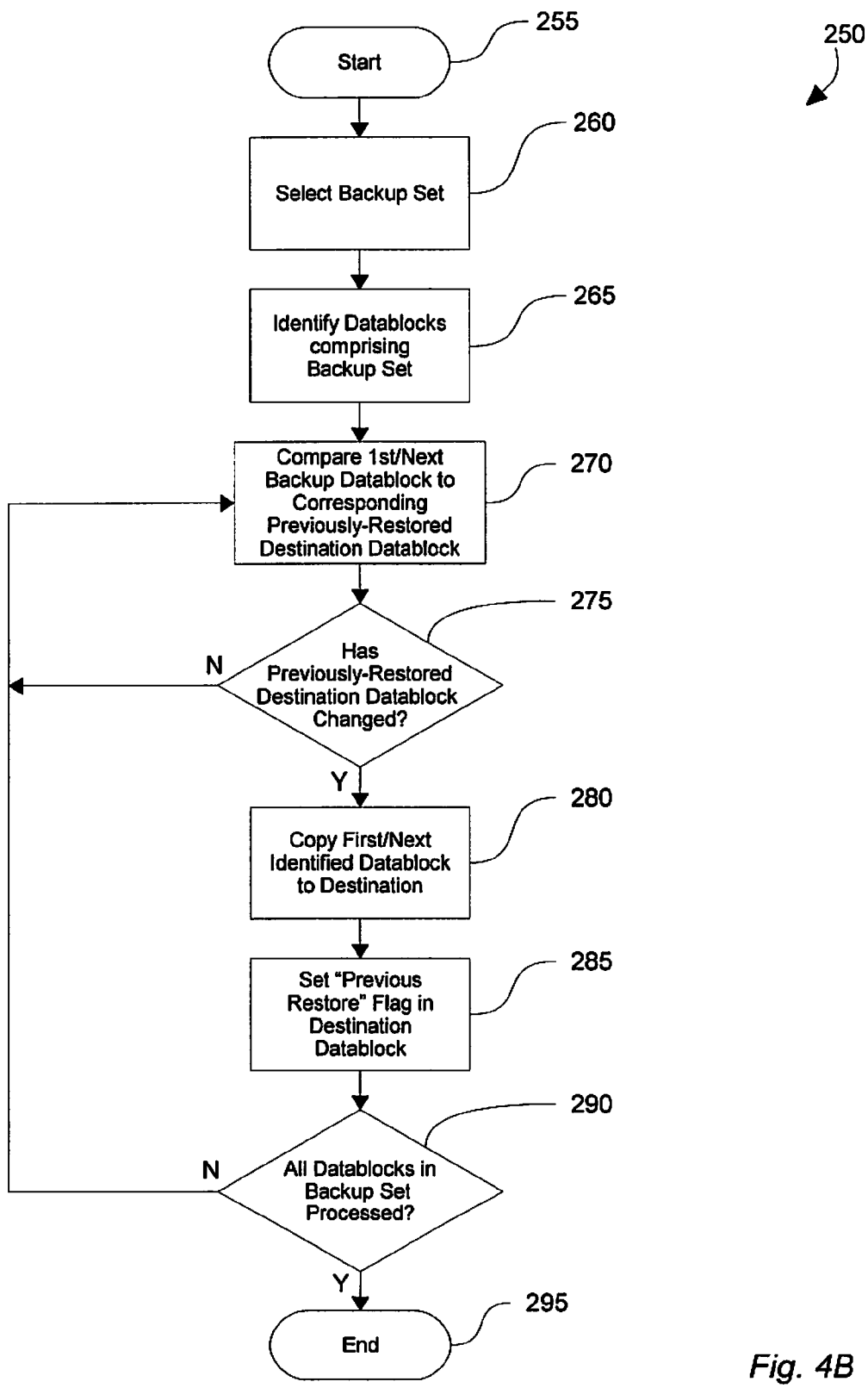
FIG. 4B is a flowchart of an embodiment of another aspect of a virtual machine data replication method in accordance with the present disclosure.
Figure 5:
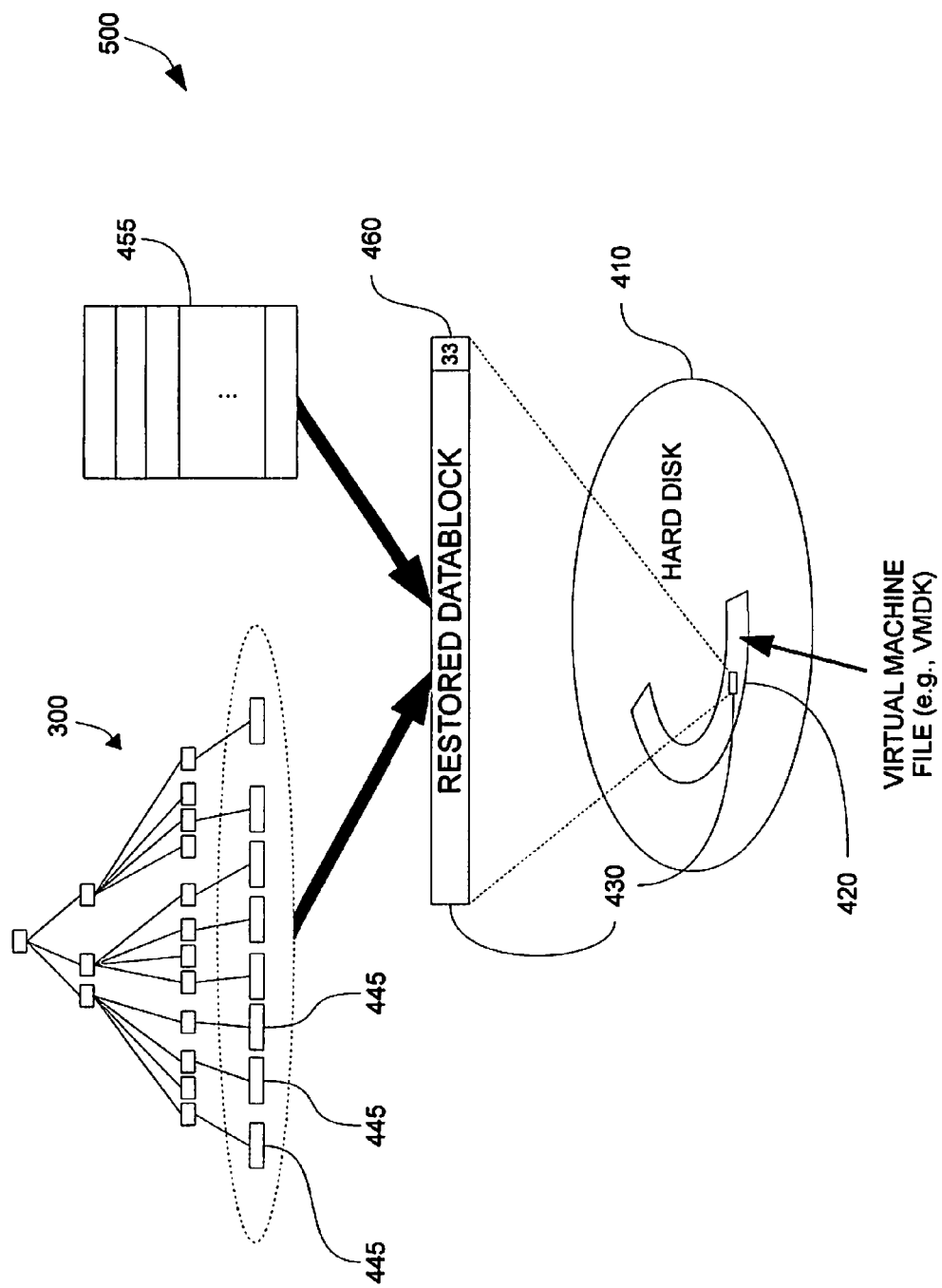
FIG. 5 illustrates a block diagram of an embodiment of a virtual machine data replication method in accordance with the present disclosure.

With reference to FIGS. 4A, 4B, and 5, the disclosed method of performing data replication 200 starts with the step 205, which may include initialization, housekeeping, resource allocation (e.g., memory allocation, opening I/O channels, instantiation), and the like. In the step 210 the desired backup set, and a desired destination location, is selected. In an embodiment, the backup set and/or destination selection may be performed by any suitable manner of selection, including without limitation, via a user interface (e.g., a web-based interface), via an application programming interface (API), remote procedure calls (RPC), and the like. In the step 215, the set of datablocks comprising the backup set are identified. Index file 455 may be consulted (e.g., data read therefrom) to determine which data blocks comprise the specified backup set. The target virtual machine file is reconstructed from the component data blocks thereof at the destination, which may be the original source virtual machine file represented by the backup set, and/or a different, or new, virtual machine file. In the step 220, a datablock is copied from its storage directory 330 within the backup directory hierarchy 300. Each data block is written to the target virtual machine file such that the original virtual machine file is recreated as it existed when the backup set was initially created. In the step 225, the data block is flagged as having been restored from a previous backup. Such as flag may be referred to as a "previous restore" flag. For example, and without limitation, a data element in a virtual machine file, a data block, or in metadata thereof, may indicate a virtual machine file or a data block thereof was restored from a previous backup. In another non-limiting example, a timestamp associated with the datablock may be set to a predetermined value to indicate a virtual machine file or a data block thereof was restored from a previous backup, e.g., a timestamp seconds field may be set to "33". In the step 230, a determination is made as to whether all the component datablocks of the backup set have been copied to the destination. If datablocks remain to be copied, the process iterates with the step 220. If it is determined all datablocks have been copied, the process concludes with the step 235. Step 235 may include reporting to a user, or calling program, statistics indicative of the restoration process, such as without limitation, number of blocks copied, amount of data processed, execution time, and the like.

With particular reference now to FIG. 4B, a subsequent restoration procedure 250 of a virtual machine file in accordance with the present disclosure is presented wherein a previous restore flag may be read to determine whether a given virtual machine file and/or data block thereof was previously restored from a backup set. In the step 255, initialization, housekeeping, resource allocation (e.g., memory allocation, opening I/O channels), and the like, may be performed. In the step 260 the desired backup set, and a desired destination location, is selected. In an embodiment, the backup set and/or destination selection may be performed by any suitable manner of selection, including without limitation, via an user interface (e.g., a web-based interface), via an application programming interface (API), remote procedure calls (RPC), and the like. In the step 265, the set of datablocks comprising the backup set are identified. Index file 455 may be consulted to determine which data blocks comprise the specified backup set.

In the steps 270 and 275, a candidate backup datablock for restoration to the destination location is evaluated to determine whether the corresponding block at the destination location has changed since a previous backup. In one embodiment, a "previous restore" flag 460 may be tested to make this determination. For example, and without limitation, a previous restore flag 460 may include a timestamp of the destination block. The timestamp may be tested to determine whether the seconds field is set to a predetermined value, e.g., "33", thus indicating the corresponding virtual machine file and/or datablock was previously restored from a backup set (e.g., unchanged.) In another envisioned embodiment, identification of a changed destination data block may be performed by comparing a hash value of the destination data block, which may be from an initially-restored virtual machine file, to the hash value of the corresponding data block of the identified backup set. If the hash values do not match, it is assumed the data block changed from the initially-restored file to the current backup set. If the hash values of the destination and backup datablocks match, it is assumed the corresponding destination datablock is unchanged from a previous restoration.

If, in the step 275, it is determined the destination datablock has changed from a previously-restored version, the data block from the current backup set is copied over the corresponding block in the destination virtual machine file in the step 280. In the step 285, a previous restore flag 460 of the just-written destination datablock is set to a predetermined value indicating the datablock is unchanged, e.g., has been previously restored from a backup datablock. Additionally or alternatively, upon completion of a restoration, a timestamp associated with the virtual machine file and/or a data block thereof may be reset. A previous restore flag 460 associated with the virtual machine file and/or a data block thereof may additionally or alternatively be set, e.g., a timestamp seconds field may be set to "33". In the step 290, a determination is made as to whether all the candidate datablocks of the backup set have been evaluated for possible copying to the destination. If datablocks remain to be processed, execution iterates with the step 270. If it is determined all datablocks have been process, execution concludes with the step 295. Step 295 may include reporting to a user, or calling program, statistics indicative of the restoration process, such as without limitation, number of blocks copied, total block processed, amount of data processed, execution time, and the like.

However, if in the step 275 it is determined that the destination datablock has not changed from a previous restoration, it is assumed the subject data block is unchanged, and therefore, the data block is skipped (e.g., not copied from the backup set to the destination virtual machine) and processing iterates with the step 270. By eliminating the transfer of redundant or duplicative datablocks in this manner, a virtual machine can be restored or replicated with increased efficiency and speed. It is envisioned that image-level (e.g., a virtual machine image) restoration and file-level (e.g., one or more individual files within a virtual machine) restoration may be performed by the disclosed method.

A data verification step may be performed wherein, for each identified changed data block, a hash value (e.g., an MD5 hash) of the stored datablock is computed and compared to a stored (e.g., previously-computed) hash value for the respective stored data block. If the computed hash value for any identified changed data block does not match the stored hash value, a complete virtual machine restoration is performed, e.g., all blocks of the virtual machine backup set are copied over the corresponding blocks of the destination virtual machine file. If the computed hash value for any identified changed data block correctly matches the stored hash value, only the identified changed blocks are copied over the corresponding blocks of the destination virtual machine file.

In embodiments, a file-level restoration in accordance with the present disclosure may be performed by identifying which data block(s) contain at least a portion of a file to be restored. For each block thus identified, a hash value check is performed as described hereinabove to determine which of the block(s) is changed with respect to the initially-restored version of the target virtual machine. Only those blocks which contain changed data are copied to the virtual machine file.

The present disclosure is also directed to a computer-based apparatus and a computing system configured to perform a method of data replication as described herein. Also disclosed is computer-readable media comprising a set of instructions of performing a method of data replication as described herein.

While several embodiments of the disclosure have been shown in the drawings and/or discussed herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. The claims can encompass embodiments in hardware, software, or a combination thereof. Those skilled in the art will envision other modifications within the scope and spirit of the claims appended hereto.

What is claimed is:

1. A method for restoring to a first storage device a virtual machine file data from a second storage device containing a backup set of the virtual machine data file, the backup set including at least one backup datablock and an index file, comprising the steps of:
   identifying a backup data block of the backup set corresponding to a target data block of the virtual machine file;
   evaluating whether a corresponding target data block has changed since a previous restoration;
   writing the backup data block to the target data block in response to an evaluation that the corresponding target data block has changed since a previous restoration;
   computing a hash value corresponding to a stored datablock;
   determining whether the computed hash value is equal to a stored hash value corresponding to the stored datablock; and
   causing the entirety of the backup set to be written to the first storage device responsive to a determination that the computed hash value does not equal the stored hash value.

2. The method in accordance with claim 1, wherein the evaluating step is performed at least in part by comparing a hash value of the backup data block to a hash value of the target data block.

3. The method in accordance with claim 2, wherein the hash value is computed in accordance with an MD5 algorithm.

4. The method in accordance with claim 1, further comprising determining whether the first storage device virtual machine data file was previously restored.

5. The method in accordance with claim 1, wherein a virtual machine data file includes a previous restore flag.

6. The method in accordance with claim 5, wherein a previous restore flag indicates the virtual machine data file was restored at least partially from a backup set.

7. The method in accordance with claim 1, wherein the previous restore flag includes a timestamp.

8. Machine-readable media comprising a set of instructions configured to perform the method in accordance with claims 1 through 7.

9. A system for performing data restoration, comprising:
   a processor;
   a storage device operably coupled to the processor; and
   a data backup module including a set of instructions executable on the processor for performing a method of data backup comprising the steps of:
   identifying a backup data block of the backup set corresponding to a target data block of the virtual machine file;
   evaluating whether a corresponding target data block has changed since a previous restoration;
   writing the backup data block to the target data block in response to an evaluation that the corresponding target data block has changed since a previous restoration;
   computing a hash value corresponding to a stored datablock;
   determining whether the computed hash value is equal to a stored hash value corresponding to the stored datablock; and
   causing the entirety of the backup set to be written to the first storage device responsive to a determination that the computed hash value does not equal the stored hash value.

10. The system in accordance with claim 9, wherein the evaluation step of the method is performed at least in part by comparing a hash value of the backup data block to a hash value of the target data block.

11. The system in accordance with claim 9, wherein the hash value is computed in accordance with an MD5 algorithm.

12. The system in accordance with claim 9, further comprising determining whether the first storage device virtual machine data file was previously restored.

13. The system in accordance with claim 9, wherein a virtual machine data file includes a previous restore flag.

14. The system in accordance with claim 13, wherein a previous restore flag indicates the virtual machine data file was restored at least partially from a backup set.

15. The system in accordance with claim 13, wherein the previous restore flag includes a timestamp.

* * * * *